Feb. 7, 1967    F. L. HOLGERSON    3,302,618
LIVESTOCK LIQUID TREATMENT APPARATUS
Filed Sept. 10, 1965    2 Sheets-Sheet 1

INVENTOR
FRED L. HOLGERSON

BY

ATTORNEY

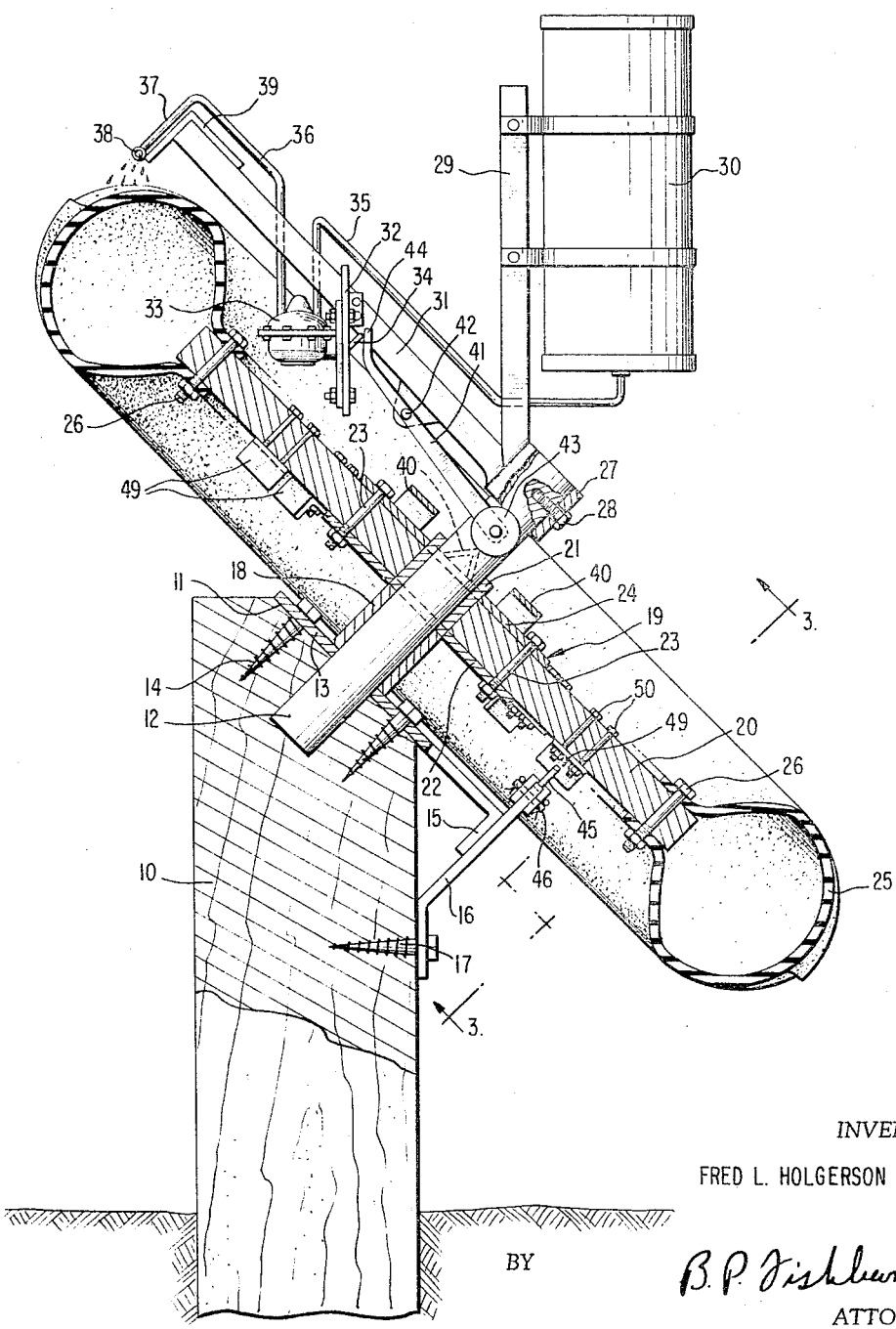

United States Patent Office 3,302,618
Patented Feb. 7, 1967

3,302,618
LIVESTOCK LIQUID TREATMENT APPARATUS
Fred L. Holgerson, Box 215, Meriden Rte.,
Cheyenne, Wyo. 82001
Filed Sept. 10, 1965, Ser. No. 486,274
4 Claims. (Cl. 119—157)

This invention relates to livestock treatment apparatus and more particularly to an apparatus for applying oil and insecticide to livestock.

The invention apparatus takes advantage of the fact that cattle and other livestock instinctively seek out a solid object to rub against in order to massage or scratch their hides. According to the invention, this natural action of the livestock is utilized to cause automatic dispensing of oil and/or insecticide onto a semi-rigid member which is arranged in such a manner that substantially the entire body of the livestock may be treated. Heretofore, in the prior art, it has been the practice to utilize suspended oil-soaked gunny sacks or the like, beneath which the cattle must pass to receive oil or insecticide while simultaneously rubbing against a post or some other firm object. Such crude arrangements are very inefficient, and it is the object of this invention to improve upon the prior art by the provision of a simplified and efficient treatment apparatus of the above-mentioned character.

A further object of the invention is to provide a large stock oiler and treatment apparatus which is characterized by ruggedness and durability, ease of assembly or mounting in any desired location, and relatively few inexpensive parts which are trouble-free in operation.

Another object is to provide a device of the mentioned character which may treat large or small livestock including cows and pigs and which may be utilized by as many as three cows or four or five pigs at one time.

Still another object is to provide a treatment apparatus of the mentioned type which has a reservoir of sufficient size to hold enough crank case oil and insecticide for as many as fifty cows over a period of a month or more without reservicing.

Other objects and advantages of the invention will be apparent during the course of the following detailed description.

In the accompanying drawings forming a part of this application and in which like numerals are employed to designate like parts throughout the same, FIGURE 1 is a perspective view of a livestock treatment apparatus embodying the invention;

FIGURE 2 is an enlarged central vertical section taken on line 2—2 of FIGURE 1;

Figure 1:
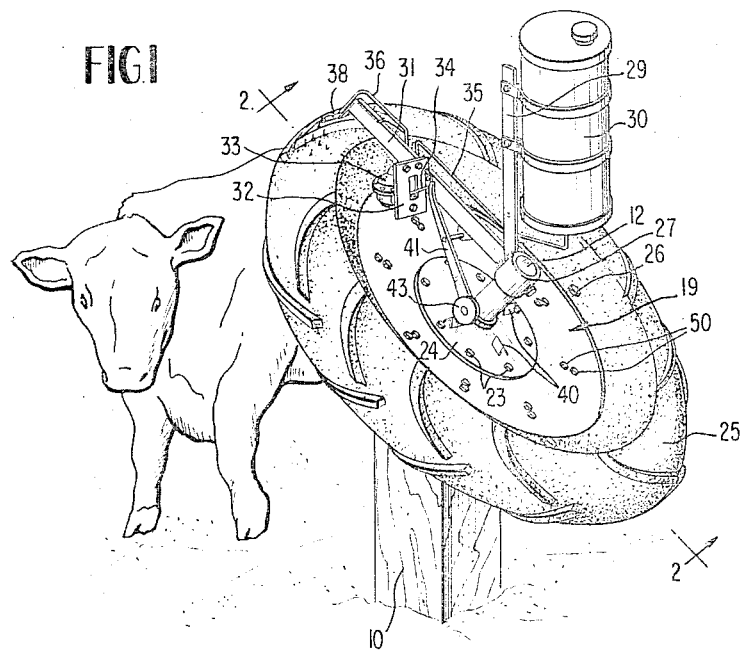

In the drawings, wherein for the purpose of illustration is shown a preferred embodiment of the invention, the numeral 10 designates a sturdy supporting post which may be firmly anchored in the ground at any desired location in a pasture or the like. The post has an inclined mounting face 11 formed thereon preferably at an angle of 45° to the vertical. This mounting face 11 is bored at right angles thereto to form a socket for the lower end portion of a fixed axle or shaft 12 which extends perpendicular to the mounting face 11 and above the same. The axle 12 is rigidly secured by welding or the like to a flat bracket plate 13, rigidly secured by screws 14 to the inclined face 11, whereby the axle is fixedly secured to the supporting post 10. The bracket plate 13 has a lower extension 15 rigidly secured to a brace 16 extending perpendicular to the mounting face 11 and having its lower end anchored at 17 to one side of the post.

A relatively short spacer sleeve 18 surrounds the axle 12 immediately above bracket plate 13 and rests upon the latter. A wheel structure 19 is received rotatably on the fixed axle 12 above the spacer sleeve 18 and rests upon the spacer sleeve, FIGURE 2.

The wheel structure 19 includes a flat circular body portion or disc 20 which may be formed of wood, metal or other desirable material. The disc 20 is centrally bored to receive a hub sleeve 21, which in turn is freely rotatably mounted on the fixed axle 12. The hub sleeve 21 is welded to or integral with a lower flat hub plate 22, rigidly connected by through bolts 23 with an upper hub plate 24. It may be seen that the disc 20 is rigidly clamped between the two hub plates 22 and 24 and is adapted to turn therewith as a unit on the axle 12.

The wheel structure 19 further comprises an outer semi-rigid annular rubbing or massaging element 25, conveniently formed by a used tractor tire casing or the like. As shown in the drawings, the element 25 may be bolted to the disc 20 by a plurality of bolts 26.

Upon the top of the fixed axle 12 is mounted a sleeve 27 secured against movement relative to the axle by a radial screw 28. The sleeve 27 carries a vertical or upright arm 29 preferably formed integral therewith and constituting the support for a suitable tank 30 adapted to contain oil or a mixture of oil and insecticide or any other liquid with which it is desired to treat livestock. The tank 30 is preferably large enough to contain up to five gallons of the liquid.

The sleeve 27 has rigidly secured to it another supporting arm 31 parallel to the disc 20 and at right angles to the axle 12. Mounted upon the arm 31 intermediate its ends is a mounting bracket 32 for a small pump 33, similar to an automobile fuel pump, the pump having a movable operating element 34 of a well-known type which projects through an opening in the bracket 32, FIGURES 1 and 2.

A liquid inlet tube 35 leads from the bottom of the tank 30 to an inlet fitting of the pump 33, and a liquid discharge tube 36 leads from an outlet fitting of the pump to the outer end of arm 31, where the tube 36 is directed downwardly at 37 and connected into an open-ended outlet extension 38 which lies close to the top of the applicator element 25 to discharge liquid directly onto the same. The outlet extension 38 and tube 36 may be stabilized by an L-bracket 39 fixed upon the arm 31 and also fixed to the extension 38.

In order to operate the pump 33 cyclically as the wheel structure 19 is turned in one direction by livestock, a plurality of preferably inverted V-shaped cam elements 40 are rigidly mounted upon the hub plate 24 in surrounding circumferentially equidistantly spaced relation to the fixed axle 12. The cam elements 40 are preferably four in number although the number may be varied in some instances. A pump actuator lever 41 extends generally parallel to the arm 31 and is pivoted thereto intermediate its ends by a pivot pin 42 supported on the arm 31, as shown. The lower end of lever 41 carries a follower roller 43 adapted to ride over the several cam elements 40 which in turn lift the roller and cause pivoting of the lever cyclically. The lever 41 has an upper terminal portion 44 in direct contact with the operating element 34 of the pump, whereby each time the roller 43 rides over a cam element 40, the pump 33 will discharge a small quantity of liquid from the outlet extension 38 onto the element 35.

Figure 4:
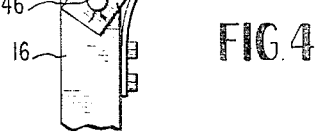
FIGURE 4 is an enlarged fragmentary side elevation of a ratchet device utilized to allow turning of the apparatus in one direction while preventing reverse rotation thereof.

Means are provided to allow free rotation of the wheel structure 39 in one direction in response to rubbing by livestock, and to prevent reverse rotation of the wheel structure. Such means comprises a pawl 45, FIGURE 4, pivoted at 46 on the top of brace 16. The pawl 45 may turn in one direction upon its pivot and such movement is resisted by a leaf spring 47 on the brace 16. Pivoting of the pawl 45 in the opposite direction is positively limited by a rigid stop 48 on the brace 16.

Figure 3:
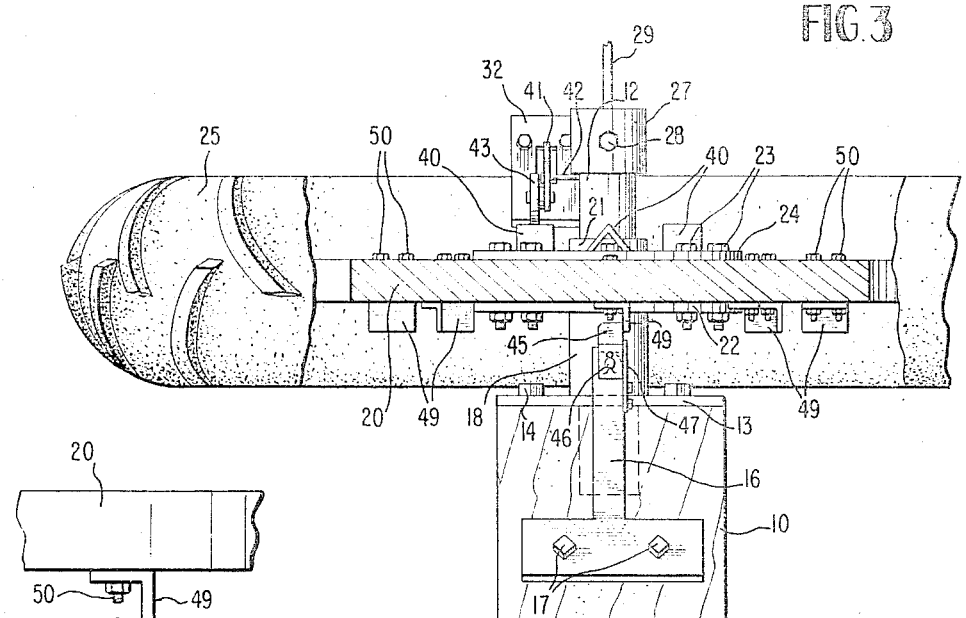
FIGURE 3 is a fragmentary sectional view taken on line 3—3 of FIGURE 2.

The underside of the disc 20 carries a plurality of circumferentially equidistantly spaced lugs or teeth 49, bolted to the disc as at 50. When the wheel structure 19 is caused to rotate in one direction by the rubbing action of the animal against the tire casing 25, the teeth 49 are able to ride over the pawl 45 as the latter pivots against the spring 47. During this rotation of the wheel structure, the pump 33 discharges oil and insecticide onto the casing 25 as previously explained. When the rubbing action of the animal tends to rotate the wheel structure in the opposite direction on the fixed axle 12, the pawl 45 positively resists this reverse rotation by assuming the positive stop position illustrated in FIGURE 3 and engaging the adjacent tooth 49 positively, as indicated. Consequently, the rubbing action of the animal, while the wheel structure is held against rotation, permits the liquid on the casing 25 to be thoroughly rubbed and massaged into the hide for oiling the hide and repelling insects. Each time the animal causes rotation of the wheel structure in the direction permitted by the pawl 45, pumping of additional liquid will take place and each time that the wheel is held against rotation by the pawl, the liquid may be massaged into the hide of the animal.

The advantage of the diagonal mounting of the wheel structure is that the upper portion of the casing 25 may be utilized to rub the back, flanks, shoulders and neck of a cow. The lower portion of the casing 25, which may be less than a foot above the ground, is available to apply the liquid on the fetlocks and lower limbs of the animal. Additionally, the arrangement allows as many as three cows or four or five pigs to be treated simultaneously at different portions or sides of the wheel structure.

While the massaging element 25 has been designated as a tire casing, it should be realized that the invention is not limited in this respect and that any suitable annular semi-rigid member may be employed on the wheel structure to rub the liquid into the hide of the animal.

It is believed that the advantages of the invention will now be readily apparent to those skilled in the art without the necessity for any further description. The structure is rugged and durable as well as simplified and requires practically no maintenance. It is very efficient in applying the desired liquid to the animal so that the livestock will be free of flies which are known to sap strength and to cause loss of weight.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A treatment apparatus for livestock comprising a stationary support, an inclined axle carried by the support, a wheel-like unit journaled for rotation on said axle and having a peripheral rubber-like massaging element and a substantially rigid central disc body portion, said wheel-like unit adapted to be rotated by livestock, pawl and ratchet means connected with said unit and allowing the same to rotate freely in one direction and positively arresting rotation in the opposite direction, a pair of supporting arms on said axle, a liquid supply tank on one of said arms, a pump on the other arm having inlet and discharge lines connected therewith, the inlet line of the pump connected with the tank, the discharge line of the pump extending to a point near and above the massaging element to supply liquid directly thereto, a pivoted lever on one of said arms for actuating said pump and having a follower part, and cam means carried by the wheel-like unit and engaging the follower part during rotation of the wheel-like unit in said one direction.

2. The invention as defined by claim 1, and wherein the cam means comprises a plurality of circumferentially spaced raised cam elements on the wheel-like unit moving in a path therewith to engage said follower part cyclically.

3. A livestock treatment apparatus comprising a fixed support having an inclined upper face spaced above ground during use, an axle member anchored to said support and projecting thereabove substantially at right angles to said inclined face, a tubular hub element freely rotatably mounted upon the axle member, a rigid disc body portion secured to the hub element and projecting radially of the hub element and axle member a distance which is substantial in comparison to the elevation of the support above the ground, a vehicular tire carcass secured to the peripheral portion of the disc body portion and projecting a substantial distance radially thereof, the disc body portion and tire carcass lying in an inclined plane and being of a diameter whereby the upper and lower extremities of the tire carcass lie substantial distances above and below the top of the support, means connected with the disc-like body portion enabling it to turn in one direction and resisting reverse rotation thereof, spaced cam projections on the disc body portion radially outwardly of the axle member, and liquid supply means mounted upon the axle member and including a follower element activated by the cam projections and adapted during rotation of the disc body portion in one direction to discharge liquid upon the upper extremity of the tire carcass.

4. A livestock treatment apparatus comprising a fixed support post, an axle member projecting from the support post near its top and being inclined, a relatively large diameter axially thin disc body portion rotatably mounted on the axle member, a vehicular tire carcass secured to the disc body portion and projecting radially thereof to form a yielding massage element, said disc body portion and tire carcass lying in an inclined plane substantially at right angles to the axle member and extending for substantial distances above and below the top of the support post, means connected with the disc body portion to resist rotation thereof in one direction while allowing free rotation thereof in an opposite direction, liquid supply means on the axle member including an outlet to direct liquid downwardly onto the tire carcass at the top thereof during rotation of the tire carcass in one direction, and mechanism connected with said supply means and disc body portion and operated by rotation of the disc body portion to activate the liquid supply means.

References Cited by the Examiner

UNITED STATES PATENTS

| 1,256,828 | 2/1918 | Perry | 119—157 |
| 3,038,445 | 6/1962 | Fleming | 119—157 |
| 3,103,916 | 9/1963 | Keene | 119—157 |
| 3,156,216 | 11/1964 | Poage | 119—157 |

SAMUEL KOREN, *Primary Examiner.*

HUGH R. CHAMBLEE, *Examiner.*